(12) United States Patent
Luo et al.

(10) Patent No.: US 11,810,235 B2
(45) Date of Patent: Nov. 7, 2023

(54) METHOD FOR ESTABLISHING COMPLEX MOTION CONTROLLER

(71) Applicants: Inventec (Pudong) Technology Corporation, Shanghai (CN); INVENTEC CORPORATION, Taipei (TW)

(72) Inventors: Ying-sheng Luo, Taipei (TW); Jonathan Hans Soeseno, Taipei (TW); Trista Pei-Chun Chen, Taipei (TW); Wei-Chao Chen, Taipei (TW)

(73) Assignees: INVENTEC (PUDONG) TECHNOLOGY CORPORATION, Shanghai (CN); INVENTEC CORPORATION, Taipei (TW)

( * ) Notice: Subject to any disclaimer, the term of this patent is extended or adjusted under 35 U.S.C. 154(b) by 45 days.

(21) Appl. No.: 17/547,419

(22) Filed: Dec. 10, 2021

(65) Prior Publication Data

US 2023/0079986 A1    Mar. 16, 2023

(30) Foreign Application Priority Data

Sep. 14, 2021    (CN) .......................... 202111075964.9

(51) Int. Cl.
*G06T 13/00*    (2011.01)
*G06T 13/40*    (2011.01)
*G06T 7/20*    (2017.01)
*G06N 3/08*    (2023.01)

(52) U.S. Cl.
CPC .............. *G06T 13/40* (2013.01); *G06N 3/08* (2013.01); *G06T 7/20* (2013.01); *G06T 2213/12* (2013.01)

(58) Field of Classification Search
CPC ............ G06T 13/00; G06T 13/40; G06T 7/20
See application file for complete search history.

(56) References Cited

U.S. PATENT DOCUMENTS

| | | | |
|---|---|---|---|
| 2008/0118153 A1* | 5/2008 | Wu ........................ | G06V 20/40 382/190 |
| 2009/0210781 A1* | 8/2009 | Hagerott ................. | G06F 9/451 715/234 |
| 2012/0038628 A1* | 2/2012 | Corazza .................. | G06T 13/40 345/419 |

(Continued)

*Primary Examiner* — Yi Yang
(74) *Attorney, Agent, or Firm* — Locke Lord LLP; Tim Tingkang Xia, Esq.

(57) ABSTRACT

A method for establishing a complex motion controller includes following steps: obtaining a source controller and a destination controller, wherein the source controller is configured to generate a source motion, and the destination controller is configured to generate a destination motion; determining a transition tensor between the source controller and the destination controller, wherein the transition tensor has a plurality of indices, one of the plurality of indices corresponds to a plurality of phases of the source motion; calculating a plurality of transition outcomes of the transition tensor and recording the plurality of transition outcomes according to the plurality of indices; calculating a plurality of transition qualities according to the plurality of transition outcomes; and searching for an optimal transition quality from the plurality of transition qualities to establish a complex motion controller for generating a complex motion corresponding to one of the plurality of phases.

8 Claims, 6 Drawing Sheets

(56) References Cited

U.S. PATENT DOCUMENTS

| | | | |
|---|---|---|---|
| 2012/0256928 A1* | 10/2012 | Chiculita | G06T 13/20 |
| | | | 345/473 |
| 2020/0396231 A1* | 12/2020 | Krebs | H04L 63/1425 |
| 2021/0097747 A1* | 4/2021 | Sachter-Zeltzer | G06T 3/0093 |
| 2021/0229279 A1* | 7/2021 | Colbrunn | B25J 13/088 |

* cited by examiner

METHOD FOR ESTABLISHING COMPLEX MOTION CONTROLLER

CROSS-REFERENCE TO RELATED APPLICATIONS

This non-provisional application claims priority under 35 U.S.C. § 119(a) on Patent Application No(s). 202111075964.9 filed in China on Sep. 14, 2021, the entire contents of which are hereby incorporated by reference.

BACKGROUND

1. Technical Field

This disclosure relates to a motion controller of a character, and more particularly, to a framework for establishing a physically accurate transition transitions outside of the motion dataset.
202111075964.9

2. Related Art

High quality character animation with a rich set of motion capability is highly desirable in cartoons, video games, and digital effects.

Traditionally, to synthesize new animations from motion capture data, one would create an interpolation structure such as a motion graph, where the nodes represent well-defined actions from motion capture data, and the edges define the transition between the actions. To synthesize new animations, one would look up the appropriate motions from this motion graph. As a look-up mechanism, the motion graph needs to include as many possible interactions as possible between the agent and its surroundings, in order to serve the purposes well. Thus, such motion graph tends to be impractically big and complex. Despite the complexity, the motion graph would still not be useful for motion synthesis when unseen scenarios arise. In addition, the complexity of searching in the motion graph limits the fineness of control.

Even the motion graph is added with a neural network, such as the auto-regressive model, restricted Boltzmann machine, temporal convolution, or recurrent variational auto-encoder, these neural network approaches struggle with producing long motion sequences and prone to averaging the motions, causing the character's movements to look jittery, stiff, or suffer from severe foot-sliding. In addition, the approach adapted to bipeds does not adapt well to quadrupeds.

Research on the kinematic controller solves the labeling problem of motion graph by reducing the need for crafting transitions between actions while allowing users to control the agent to produce the desired motions. In addition, one can certainly resort to physics-based controllers to model complex phenomenon effectively, as a physical simulation enables the agent to produce meaningful reactions to external perturbations without the need to collect or animate such a reaction. A recent physics-based controller that is based on the kinematic controller while preserving the naturalness of the motions via generative adversarial network (GAN) has allowed the motion controller to produce great physically plausible and natural motion.

To increase the capability of the motion controller in order to produce rich motions, one may resort to adding new motion data for a learning-based method to learn. However, every time new data is added, the controller needs to relearn a large model for the motion controller. Alternatively, one can add new physics-based controller as a module, and only retrain the gating network that modulate the individual physics-based controller. However, even if only one new module is added, the complexity of multi-layer perception (MLP) training for all modules still grows exponentially, and it is necessary to avoid training after adding a new module to affect existing motions in the vocabulary.

SUMMARY

According to an embodiment of the present disclosure, a method for establishing a complex motion controller, comprising following steps performed by a processor: obtaining a source controller and a destination controller, wherein the source controller is configured to generate a source motion, and the destination controller is configured to generate a destination motion; determining a transition tensor between the source controller and the destination controller, wherein the transition tensor has a plurality of indices, and one of the plurality of indices corresponds to a plurality of phases of the source motion; calculating a plurality of transition outcomes of the transition tensor and recording the plurality of transition outcomes according to the plurality of indices; calculating a plurality of transition qualities according to the plurality of transition outcomes; and searching for an optimal transition quality from the plurality of transition qualities to establish a complex motion controller for generating a complex motion corresponding to one of the plurality of phases.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein.

DETAILED DESCRIPTION

In the following detailed description, for purposes of explanation, numerous specific details are set forth in order to provide a thorough understanding of the disclosed embodiments. According to the description, claims and the drawings disclosed in the specification, one skilled in the art may easily understand the concepts and features of the present invention. The following embodiments further illustrate various aspects of the present invention, but are not meant to limit the scope of the present invention.

The complex motion controller established by the present disclosure may be used to control a virtual character in movies, games, or robots in a real world. Please note that the term "controller" throughout the present disclosure is more likely to be considered as "a control module" or "a control unit" that performs data, commands, algorithms, etc., while the present disclosure does not specifically exclude the term representing a physical element.

Figure 1:
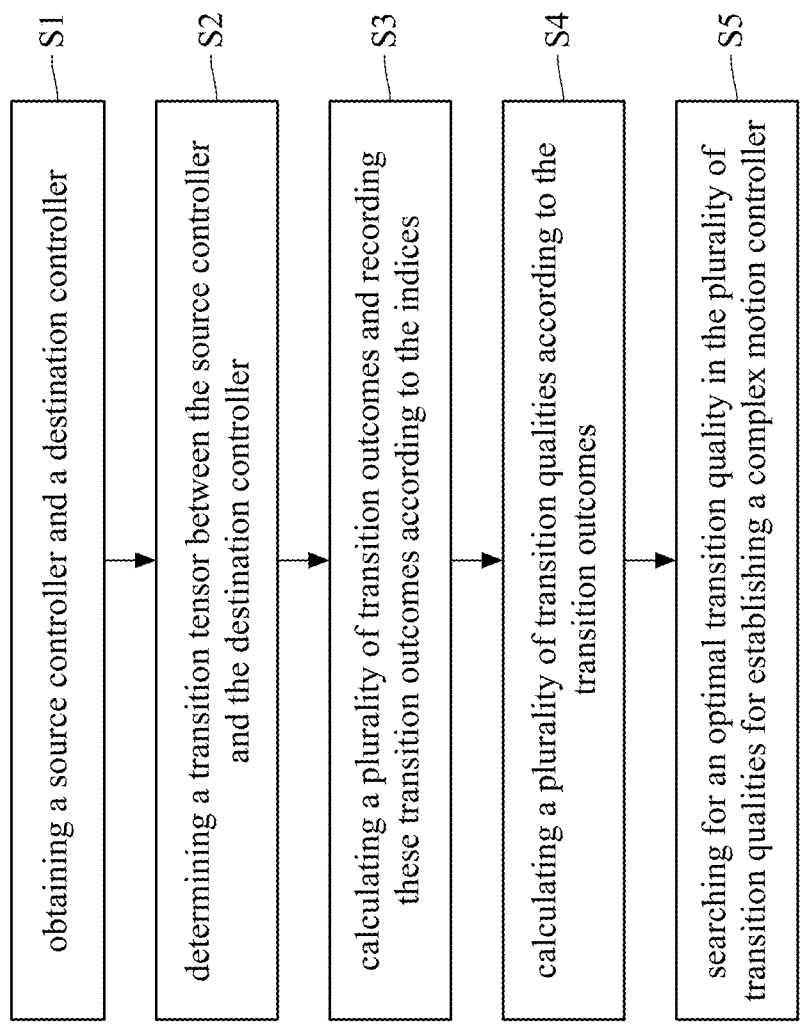
FIG. 1 is a flow chart of the method for establishing a complex motion controller according to an embodiment of the present disclosure.

FIG. 1 is a flow chart of the method for establishing a complex motion controller according to an embodiment of the present disclosure, and this method uses a processor to perform Steps S1-S5 shown in FIG. 1.

Step S1 represents "obtaining a source controller and a destination controller", Step S2 represents "determining a transition tensor between the source controller and the destination controller", Step S3 represents "calculating a plurality of transition outcomes and recording these transition outcomes according to the indices", Step S4 represents "calculating a plurality of transition qualities according to the transition outcomes", and Step S5 represents "searching for an optimal transition quality in the plurality of transition qualities for establishing a complex motion controller". The implementation details of each step are described as follows.

Specifically, regarding "obtaining a source controller and a destination controller" in Step S1, the source controller generates a source motion according to a current state of a character and a control objective, and the destination controller generates a destination motion according to another current state of the character and another control objective. For example, the source motion may be "walk", the destination motion may be "run" and the complex motion may be a transition from walk to run. The control objective comprises at least one physical control parameter, such as meters per second, gravitational acceleration when falling from a higher ground.

The source controller and the destination controller are both template controllers, and details of the template controller are described as follows.

To enable a character to perform a wide array of motions in a simulated physical environment, one may resort to training a physics-based controller to accommodate a large motion vocabulary. However, using a single controller to learn the entire vocabulary may require a substantial computation as the learning process gets unbearably intricate with many motions. To avoid such a problem, the present disclosure adopts the explicit controller assignment strategy, where each motion is assigned to a single physics-based controller, further referred to as the template controller. This strategy allows for confining the training complexity within each controller, thereby making the process more tractable and independent.

Before training the template controllers, the present disclosure collects reference motion clips corresponding to each motion using the kinematic controller. Within each motion clip, the kinematic character performs the respective motion repeatedly with slight variations over the speed, heading, and height control on each repetition. Then, in order to produce life-like movements in a dynamic environment, the present disclosure trains the template controllers using deep reinforcement learning (DRL), where at a given time step t, the template controller $\pi(a_t|s_t, c_t)$ outputs the actions $a_t \in A$, given the current state of the character $s_t \in S$, and control objective $c_t$; A and S denote the domain of action and current state respectively. The current state $s_t$ stores the character's position, rotation, velocity, and angular velocity. The high-level control objective includes $c_t=(\sigma, \theta, \hat{h})$, where $\sigma$, $\theta$, and $\hat{h}$ denote the target movement speed in meters per second, target heading in radian, and target center-of-mass (COM) height in meters, respectively.

The present disclosure initializes the template controller by performing imitation learning over the assigned reference motion clip. In the process, the controller's goal is to match the joint positions of the kinematic and simulated character, using two consecutive frames of the kinematic character as the low-level control objective. Once converged, the present disclosure further fine-tunes the template controller to follow high-level motion control directives, including speed, heading, and height. Note that since the values of the control objectives come from the reference motion clip, it is not required to specify all values all the time. For instance, the target COM height can be left unchanged when performing motions such as "Trot" or "Canter," but is required to control the height of the "Jump" motion.

Figure 2:
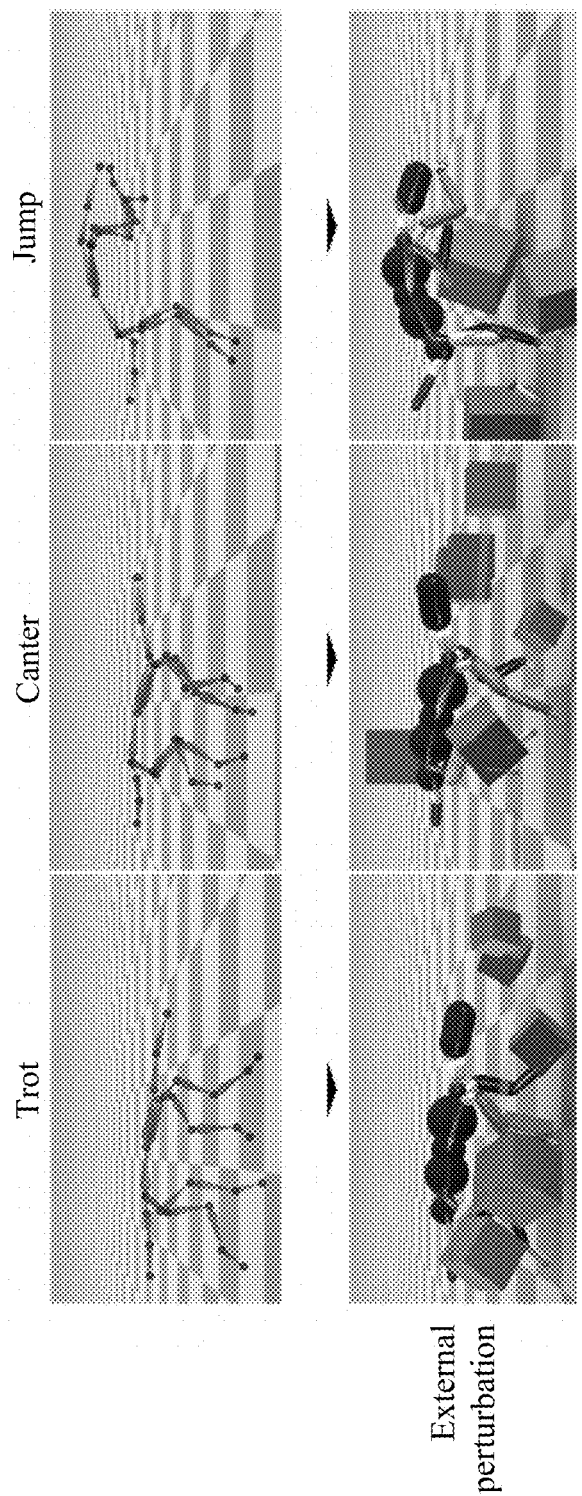
FIG. 2 is a schematic diagram of introducing external perturbations in the process of training the template controller.

To ensure the robustness of each template controller, the present disclosure introduces external perturbations during the training process, such as throwing various-sized boxes at the character from random directions as shown in FIG. 2. As a result, the present disclosure may obtain a set of controllable and robust template controllers $\Psi=\{\pi_1 \ldots \pi_6\}$, each specializing on a specific motion in the vocabulary V={Trot, Canter, Jump, Pace, Stand, Sit}, with the elements denoting motions of trot, canter, jump, pace, stand, and sit, respectively.

The present disclosure trains the template controllers using proximal policy optimization (PPO), generalized advantage estimator $GAE(\lambda)$, and multi-step returns $TD(\lambda)$. To increase sampling efficiency and prevent the controller from getting stuck in bad local optima, the present disclosure adopts the early termination and reference state initialization as proposed by "Xue Bin Peng, Pieter Abbeel, Sergey Levine, and Michiel van de Panne. 2018. DeepMimic: Example—Guided Deep Reinforcement Learning of Physics-Based Character Skills. ACM Transactions on Graphics (TOG) 37, 4 (2018), 143.".

The present disclosure represents each template controller as a hierarchical policy with lower-level controllers called the primitives. The template controllers use four primitives except for the Jump motion, which requires eight primitives to account for its additional motion complexity.

The template controllers only allow the character to perform a specific motion, limiting the character's ability to solve complex tasks that may require multiple motions to work coherently. For instance, to jump over a wide hole and quickly reach the destination, the character needs to run fast enough, followed by jumping and running towards the goal. However, knowing when to perform the transition between running and jumping is not a trivial task since the character's state directly affects the transition outcome. As a result, naively switching between the controllers may yield awkward or even unsuccessful transitions. Therefore, the present disclosure proposes a data-driven tensor in Step S2 that guides the character in successfully transitioning from one motion to another by carefully examining the critical timing of the transitions.

Regarding "determining a transition tensor between the source controller and the destination controller" in Step S2, the transition tensor (hereinafter referred to as tensor) has a plurality of indices, one of these indices corresponds to a plurality of phases of the source motion. For example, the source motion is "raising the left hand", which includes multiple phases such as the rotation of the elbow joint at 0 degree, 1 degree, 2 degrees, 3 degrees . . . to the upper limit of the rotatable angle.

Figure 3:
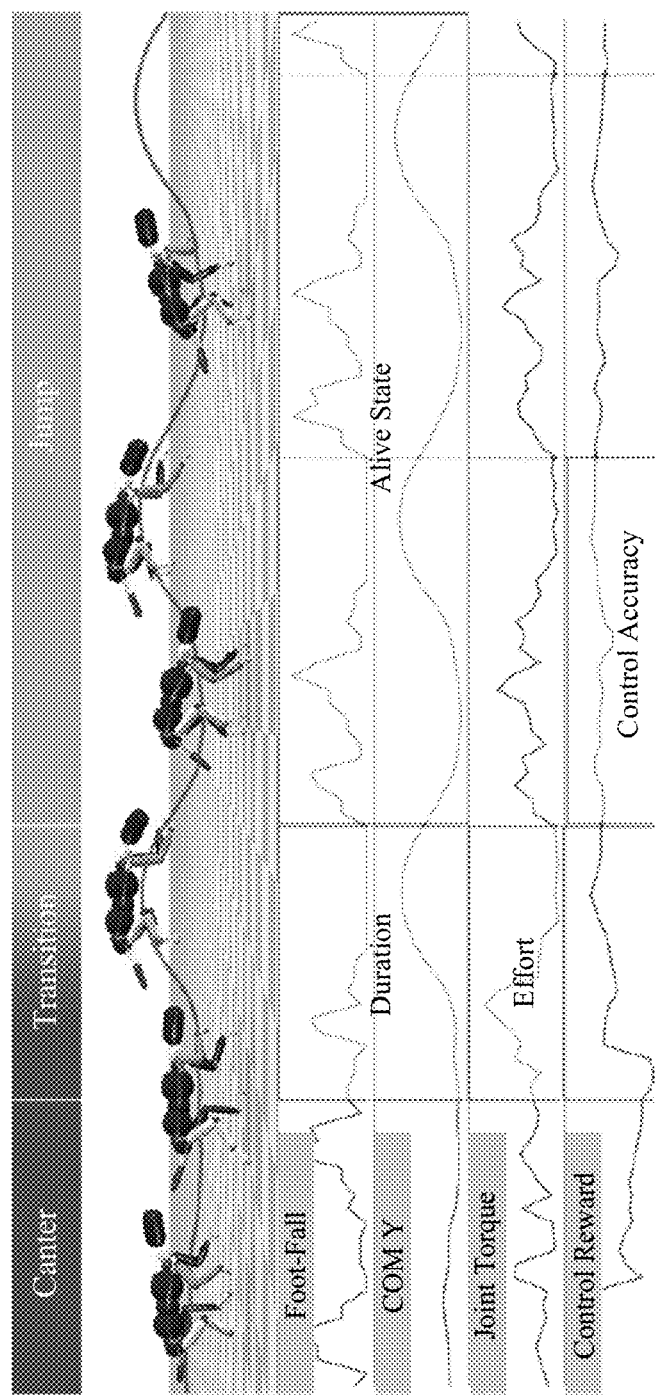
FIG. 3 is a schematic diagram of the variance of the transition tensor during the transition process from the source motion to the destination process.

Given that the character is in a particular state with the source controller, as the controller is switched from the source to the destination controller, the destination controller may have never seen this state. While it tries to recover from this unseen state, it consequently generates a new transition motion, which neither exists in the source nor the destination controller. That is, the transitions are generated by switching between the pair of controllers as shown in FIG. 3.

However, naively switching the controllers yields unstable transitions since the motions vary in difficulties. It is possible to improve the switching process by assigning control objectives compatible with both the source and the destination motion, such as interpolating the movement speed to transition between different locomotion gaits. However, this strategy is ineffective for motions that require more delicate and precise foot-fall timing which is best described with the character's phase label. For instance, the success of a transition between "Canter" and "Jump" relies heavily on the character's foot touching the ground. Therefore, transitioning from "Jump" to "Canter" when the character is mid-air may cause intricacies for the destination controller, leading to a longer time to stabilize, exerting too much effort, deviating from the control objectives, or even worse, causing the character to fall.

To describe the likelihood of a successful transition between source and destination motions, the present disclosure formulates a 4-dimensional tensor T to record the outcomes of the transitions, as shown in Equation 1.

$$T_{m,\phi,n,\omega} = (\eta, \Delta t, e, \alpha) \quad \text{(Equation 1)}$$

The four indices of the tensor T include the source controller $m \in V$ and the destination controller $n \in V$ motions, wherein V denotes vocabulary, as well as the source phase $\phi \in [0, 1)$ and the destination phase $\omega \in [0, 1)$. Note that each of the components ($\eta$, $\Delta t$, e, $\alpha$) should be dependent on w=(m, $\phi$, n, $\omega$), e.g. $\eta \equiv \eta w$.

Each element $T_w$ from the tensor is a 4-dimensional vector representing the outcome of a transition at w. The first element of the vector $\eta$ records the alive state after the transition, in which $\eta=1$ denotes a successful transition where the character's head, torso, and back do not touch the ground, and $\eta=0$ if the character fall. The second element $\Delta t$ denotes the duration of transition which begins with the switching process and ends when the destination controller stabilizes. The third element e represents the effort of the transition, for example, a summation of all joint's torque during the transition, as shown in Equation 2.

$$e = \sum_{t}^{t+\Delta t} \sum_{j=1}^{J} \tau_t^j \quad \text{(Equation 2)}$$

The PD-controller's torque of joint $j \in J$ at a given time t is denoted as $\tau_t^j$, and J denotes the number of joints of the character. To measure how well the character follows the control objective, the present disclosure defines the speed, heading, and height rewards respectively as Equations 3, 4, and 5.

$$r_t^\sigma = \exp\left(-0.8(\sigma - \|v_c\|)^2\right) \quad \text{(Equation 3)}$$

$$r_t^\theta = \left(\frac{u \cdot v_c}{\|u\| \cdot \|v_c\|} + 1\right) * 0.5 \quad \text{(Equation 4)}$$

$$r_t^h = \exp\left(-3\|h - \hat{h}\|\right) \quad \text{(Equation 5)}$$

Here, $\|\cdot\|$ denotes the l2-norm, $v_c$ and u=(cos ($\theta$), −sin ($\theta$)) respectively denote the character's COM velocity and the target heading projected into the 2-dimensional plane of motion, and h, ĥ respectively denote the character's COM heights of the source motion and destination motion. The present disclosure then defines the control reward as Equation 6.

$$r_t^C = \frac{r_t^\sigma + r_t^\theta + r_t^h}{3} \quad \text{(Equation 6)}$$

Finally, the fourth element $\alpha$ denotes the control accuracy of the character measured by the sum of control rewards between the two stable states of the destination controller $\hat{t}_1$, $\hat{t}_2$. The present disclosure measures the control accuracy post-transition under an assumption that there are no data for the transition. The control accuracy is defined as Equation 7.

$$\alpha = \sum_{t=\hat{t}_1}^{\hat{t}_2} r_t^C \quad \text{(Equation 7)}$$

Before computing the four outcomes of each transition tensor in Step S3, the present disclosure evaluates the template controller through robustness tests, which involve, for example, throwing boxes with varying sizes and densities from a random direction every 0.1 seconds. The template controller passes the robustness test when the character survives for at least 10 seconds.

FIG. 3. is a visual illustration of the variance of the transition tensor during the transition process from the source motion (e.g. Canter) to the destination motion (e.g. Jump). A recording begins with the character performing the source motion. The present disclosure waits until the source controller stabilizes before switching the currently active controller to the destination. While switching, the present disclosure feeds in the character's current state and high-level control objectives derived from the destination motion clip, sampled uniformly over the phase. Next, the present disclosure records how the controller reacts, and stores the character's foot-fall pattern, COM position, joint torques, and control accuracy. The present disclosure terminates the recording 5 seconds after the controller switching process since most controllers have either stabilized or fail at this point.

Regarding "calculating a plurality of transition outcomes and recording these transition outcomes according to the indices" in Step S3. The processor use Monte Carlo method to calculate a plurality of outcomes, each outcome comprises the alive state $\eta$, duration $\Delta t$, effort e, and control accuracy $\alpha$.

To calculate the likelihood of the transitions, the present disclosure populates the tensor by recording millions of transition samples using the Monte Carlo method in a physics-enabled environment. Each pair-wise transition is sampled uniformly across the source and destination phase.

Regarding "calculating a plurality of transition qualities according to the transition outcomes" in Step S4, wherein each transition quality comprises a stability and an outcome value, the outcome value is calculated by the processor according to the alive state, duration, effort, and control accuracy.

As shown in Equation 1, with the 4-dimensional tensor describing the likelihood of transitions between source and destination controllers, the present disclosure unifies the template controllers, allowing the character to perform all motions in the vocabulary V. Users can utilize the unified controller to steer the character when solving more complex tasks. To achieve this, the present disclosure starts with consolidating the four transition outcomes into a single number as Equation 8, wherein $\Gamma_w$ denotes the outcome over the index w.

$$\Gamma_w = \eta_w \times \frac{\alpha_w}{e_w} \times \exp(-\Delta t_w) \quad \text{(Equation 8)}$$

To measure the transition stability, the present disclosure wishes to further ensure consistency of outcomes and alive probability at neighboring samples. For this purpose, the present disclosure first defines a local neighborhood $\Gamma_w(\delta)$ which is a 2-dimensional sub-tensor of $\Gamma$ near w, and $w \in \{m, \phi \pm \delta, n, \omega \pm \delta\}$, wherein $\phi \pm \delta$ denotes a plurality of neighboring reference phases of the source motion m over phase $\phi$, and $\omega \pm \delta$ denotes a plurality of neighboring reference phases of the destination motion n over phase $\omega$.

Then, the present disclosure can calculate the consistency of the transition outcome $\zeta_w(\delta)$ as the variance of all samples in $\Gamma_w(\delta)$.

Similarly, the present disclosure computes the alive probability of a transition $\eta_w(\delta)$ as the proportion of samples within $T_w(\delta)$ having $\eta=1$.

The final form of the transition's stability is shown as Equation 9, wherein $\beta=0.015$.

$$\psi_w(\delta) = \eta_w(\delta) \times \exp(-\beta \zeta_w(\delta)) \quad \text{(Equation 9)}$$

Combining the transition stability and the outcome values, the quality of a transition at w is shown as Equation 10.

$$Q_w = \psi_w(\delta) \times \Gamma_w \quad \text{(Equation 10)}$$

Regarding "searching for an optimal transition quality in the plurality of transition qualities for establishing a complex motion controller" in Step S5. The complex motion controller is used to generate a complex motion corresponding to one of the plurality of phases of the source motion.

Figure 4:
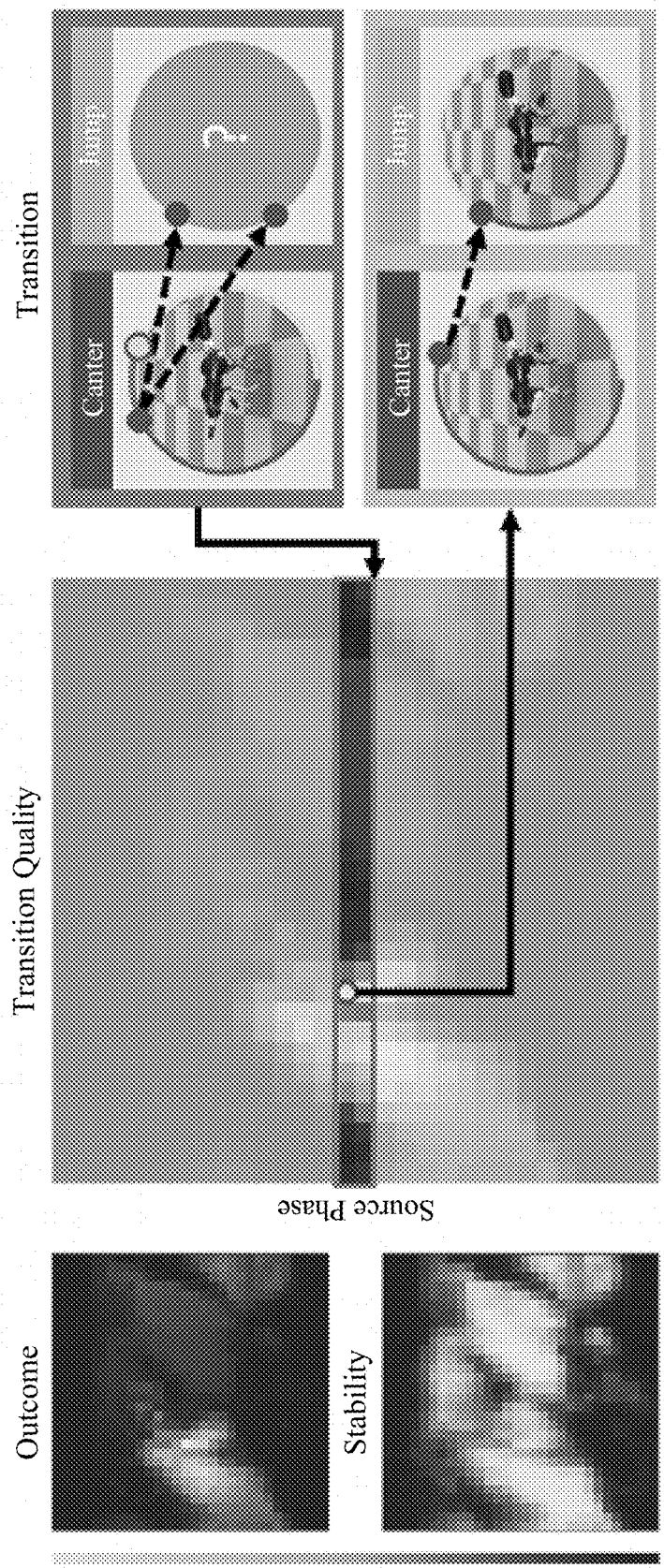
FIG. 4 is a heat map and application diagram of the transition quality and its components.

To generate the transition from the source motion to the destination motion, it needs to navigate through the tensor and search for the best transition. Given the destination motion label n, and the information regarding the source motion m and phase $\phi$, the processor can find the best transition by looking at the sub-tensor $Q_{m, \phi \pm \epsilon, n}$, where $\epsilon$ is an adjustable parameter for the search space, and locate the destination phase with highest quality value, as shown in FIG. 4. Using the best transition obtained from the tensor, transitions can be performed reliably between two controllers. Repeating the same strategy for each pair-wise transition between all motions, the present disclosure successfully unifies the template controllers into a single and versatile controller that can produce complex motions.

FIG. 4 is a heat map and application diagram of the transition quality and its components (outcome values and stability). With the phase of the source motion as the vertical axis and the phase of the destination motion as the horizontal axis, the processor can depict heat maps of the outcome values, stability, and transition quality calculated by the outcome values and the stability. The present disclosure can find, from multiple pixels of the heap map of the transition quality, the transition tensors corresponding to the transition qualities whose pixel values exceed the threshold, and filter one or more transition with better effects, such as alive state being "1", lower effort, shorter duration, and higher control accuracy.

Figure 5:
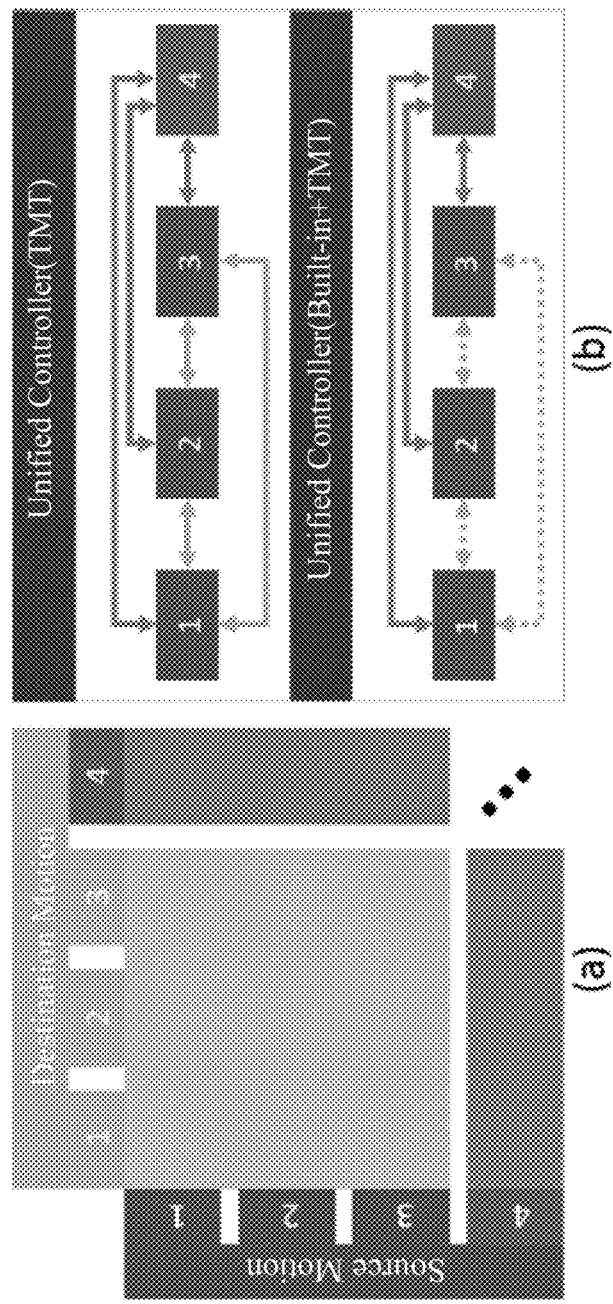
FIG. 5 is a schematic diagram of adding a new template controller.

FIG. 5 is a schematic diagram of adding a new template controller (new motion). The present disclosure uses the transition tensor to simply add new motions without increasing training costs. Specifically, the present disclosure only needs to use the template controller to describe the new motion and integrate it to the original template controller through the transition tensor. Here is the example of FIG. 5, according to the method proposed by the present disclosure, six transition tensors have been established previously, and each transition tensor is a pair consisting of two of motion 1, 2, and 3, These six transition tensors are "motion 1 to motion 2", "motion 1 to motion 3", motion "2 to motion 3", "motion 2 to motion 1", "motion 3 to motion 1", motion "3 to motion 2", wherein different orders in a pairing will form different transition tensors). During the adding of the motion 4, the present disclosure only spends the cost on establishing the transition tensors between the new motion 4 and each of the motions 1, 2, and 3. This process does not require an additional training process, and adding more motions will not change the motions and transitions previously configured. Therefore, the present disclosure can easily extend the motion vocabulary V along the dimension of the source motion label m of the tensor and the dimension of the destination motion label n, as shown in FIG. 5.

Figure 6:
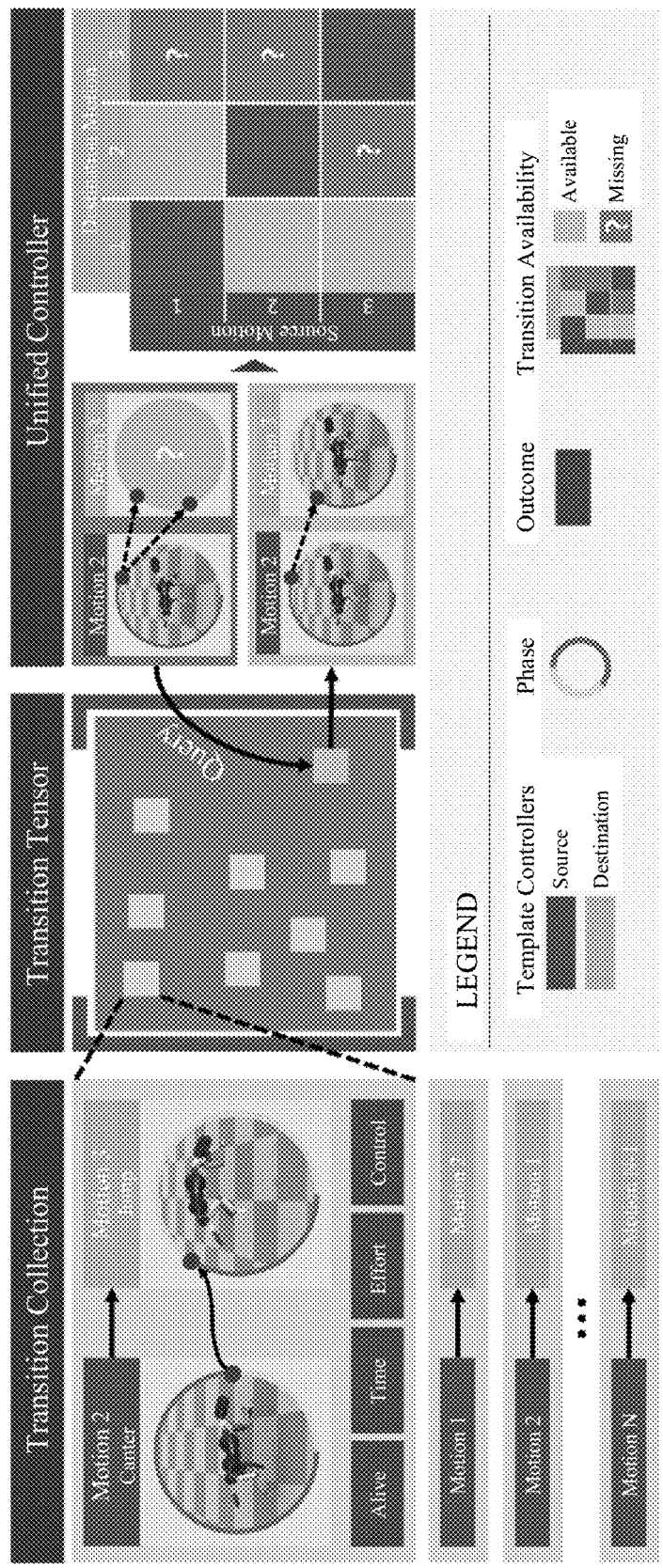
FIG. 6 is a comprehensive schematic diagram of a method for establishing a complex motion controller according to an embodiment of the present disclosure.

In general, please refer to FIG. 6, which is a comprehensive schematic diagram of a method for establishing a complex motion controller according to an embodiment of the present disclosure. The left side of FIG. 6 shows a collection of multiple transition tensors, the content of each transition tensor comprises the alive state, time (duration), effort, and control accuracy. Each transition tensor corresponds to a pair of a source controller and a destination controller. Supposed that the number of controller is N, and upper limit of the collection number of the transition transitions is N−(N−1). The middle of FIG. 6 shows completed transition tensors. The right side of FIG. 6 shows an example of generating a unified controller. Assuming that the previous unified controller does not know how to perform the transition from a certain phase of the source motion 2 to the destination motion 3, as indicated by the "?" in the second column and third row of the transition availability matrix, the processor can find the transition tensor corresponding to the source motion 2 and the target motion 3 among multiple transition tensors, and then finding one or more phase of the destination motion with the best transition quality among all the possibilities of this transition tensor, so as to achieve the transition from source motion 2 to the destination motion 3.

The present disclosure proposes a method for establishing a complex controller, which comprises a Transition Motion Tensor, a data-driven framework that establishes physically accurate and novel transitions outside of the motion dataset. The transition tensor enables the character to grow new motions efficiently and robustly without modifying existing motions.

The present disclosure proposes the method for establishing a complex motion controller, this method enables the character to grow new motions efficiently and robustly without modifying existing motions. Given several physics-based controllers specializing in different motions, the tensor proposed by the present disclosure serves as a guideline for switching between controllers. By querying the tensor for the best transitions, the present disclosure can create a unified controller capable of producing novel transitions with various behaviors, such as slowing down before higher jumps or jumping immediately for better responsiveness. The present disclosure can be applied on both quadrupeds and bipeds, perform quantitative and qualitative evaluations on transition quality, and demonstrate its capability of tackling complex motion planning problems while following user control directives.

In view of the above, the present disclosure has the following contributions or technical effects:
1. A data-driven approach to create physically accurate and novel transitions outside of the motion dataset;
2. A scalable framework to link existing controllers of various architectures or training procedures into a coherent, unified controller without additional training, and
3. A scheme to utilize the controllers to tackle complex motion planning problems while satisfying user control directives and physical environment constraints.

What is claimed is:

1. A method for establishing a complex motion controller, comprising following steps performed by a processor:
obtaining a source controller and a destination controller, wherein the source controller is configured to generate a source motion, and the destination controller is configured to generate a destination motion;
determining a transition tensor between the source controller and the destination controller, wherein the transition tensor has a plurality of indices, and one of the plurality of indices corresponds to a plurality of phases of the source motion;
calculating a plurality of transition outcomes of the transition tensor and recording the plurality of transition outcomes according to the plurality of indices;
calculating a plurality of transition qualities according to the plurality of transition outcomes; and
searching for an optimal transition quality from the plurality of transition qualities to establish a complex motion controller for generating a complex motion corresponding to one of the plurality of phases;
wherein each of the source controller and the destination controller generate each of the source motion and the destination motion according to a current state and a control objective;
wherein the source controller and the destination controller belong to a template controller;
before the template controller is trained, the method further comprises:
collecting a plurality of reference motion clips by a kinematic controller; and
changing an input parameter in a repetitive control of each of the plurality of reference motion clips; and
when the template controller is trained, the method further comprises:
introducing an external perturbation; and
using a deep reinforcement learning to train the template controller, wherein the control objective comprises a movement speed of a target, a heading of the target, and a height of a center-of-mass of the target.

2. The method for establishing the complex motion controller of claim 1, wherein each of the plurality of transition outcomes comprises an alive state, a duration, an effort, and a control accuracy.

3. The method for establishing the complex motion controller of claim 2, wherein each of the plurality of transition qualities comprises an outcome value, and the outcome value is calculated by the processor according to the alive state, the duration, the effort, and the control accuracy, based on a plurality of neighboring phases and said one of the plurality of phases.

4. The method for establishing the complex motion controller of claim 3, wherein each of the plurality of transition qualities comprises a stability, and the processor refers to an alive probability of the alive state, a local neighborhood of the outcome value, and the transition outcome associated with the local neighborhood to calculate the stability based on a plurality of neighboring phases and said one of the plurality of phases, wherein the local neighborhood comprises a plurality of reference phases, and the plurality of reference phases correspond to one of the plurality of phases of the source motion corresponding to the transition tensor corresponding to the outcome value.

5. The method for establishing the complex motion controller of claim 2, wherein calculating the plurality of transition qualities according to the plurality of transition outcomes comprises:
calculating an outcome value and a stability of each of plurality of transition outcomes; and
calculating one of the plurality of transition qualities according to the outcome value and the stability; wherein
the processor refers to the alive state, the duration, the effort, and the control accuracy to calculate the outcome value based on a plurality of neighboring phases and said one of the plurality of phases; and
the processor refers to an alive probability of the alive state, a local neighborhood of the outcome value, and the transition outcome associated with the local neighborhood to calculate the stability based on a plurality of neighboring phases and said one of the plurality of phases, wherein the local neighborhood comprises a plurality of reference phases, and the plurality of reference phases correspond to one of the plurality of phases of the source motion corresponding to the transition tensor corresponding to the outcome value.

6. The method for establishing the complex motion controller of claim 1, wherein the processor adopts a Monte Carlo method to calculate the plurality of transition outcomes.

7. The method for establishing the complex motion controller of claim 1, wherein an input of the control objective comprises at least one physical control parameter.

8. The method for establishing the complex motion controller of claim 1, wherein the source controller and the destination controller belong to a template controller, the template controller comprises at least one low-level controller corresponding to at least one primitive, and the control objective is directly assigned to said at least one low-level controller.

* * * * *